US 6,420,861 B2

(12) United States Patent
Ochi et al.

(10) Patent No.: US 6,420,861 B2
(45) Date of Patent: Jul. 16, 2002

(54) SWITCHING REGULATOR DRIVE SIGNAL CIRCUIT RESPONSIVE TO RAPID POWER SOURCE CHANGES FOR STABLE OUTPUT VOLTAGE

(75) Inventors: Taizo Ochi, Beppu; Takahiro Miyazaki, Hiji-machi, both of (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/860,248

(22) Filed: May 18, 2001

(30) Foreign Application Priority Data

May 22, 2000 (JP) ........................ 2000-149163

(51) Int. Cl.$^7$ ................................................ G05F 1/56
(52) U.S. Cl. ...................................................... 323/288
(58) Field of Search ................................. 323/282, 288

(56) References Cited

U.S. PATENT DOCUMENTS

| | | | | |
|---|---|---|---|---|
| 5,818,207 A | * | 10/1998 | Hwang ........................ 323/288 |
| 5,929,692 A | * | 7/1999 | Carsten ........................ 323/282 |
| 6,057,675 A | * | 5/2000 | Tateishi ........................ 323/288 |
| 6,115,274 A | * | 9/2000 | Mao ............................ 323/288 |
| 6,121,760 A | * | 9/2000 | Marshall et al. ............. 323/282 |
| 6,204,649 B1 | * | 3/2001 | Roman ........................ 323/282 |
| 6,215,290 B1 | * | 4/2001 | Yang et al. ................... 323/282 |
| 6,232,755 B1 | * | 5/2001 | Zhang ........................ 323/282 |
| 6,275,018 B1 | * | 8/2001 | Telefus et al. ............... 323/282 |
| 6,285,174 B1 | * | 9/2001 | Suzuki ........................ 323/288 |
| 6,316,926 B1 | * | 11/2001 | Savo et al. ................... 323/282 |

* cited by examiner

*Primary Examiner*—Jeffrey Sterrett
(74) *Attorney, Agent, or Firm*—William B. Kempler; Frederick J. Telecky, Jr.; W. James Brady

(57) ABSTRACT

The objective of this invention pertains to a drive signal supply circuit for a switching regulator. Switching regulator 1 of the present invention has amplitude center adjusting circuit 20. In switching regulator 1, a sawtooth wave and the output signal of error amplifier 11 are input to comparator 12, and a pulse signal that sets the ON/OFF state of switching transistor 2 is generated. Since the amplitude center voltage of the sawtooth wave is adjusted corresponding to the power source voltage Vcc, even when power source voltage Vcc is changed rapidly, the amplitude center adjusting circuit 20 can adjust the amplitude center voltage of the sawtooth wave at a high speed matching the rapid fluctuations, and this signal is output to comparator 12. Consequently, the pulse signal output from comparator 12 can follow the rapid fluctuations of power source voltage Vcc. As a result, the output voltage can follow the rapid fluctuations of the power source voltage. Consequently, the problem in the prior art, that is, instability due to the output voltage not being able to follow the fluctuations of the power source voltage Vcc, can be solved.

5 Claims, 11 Drawing Sheets

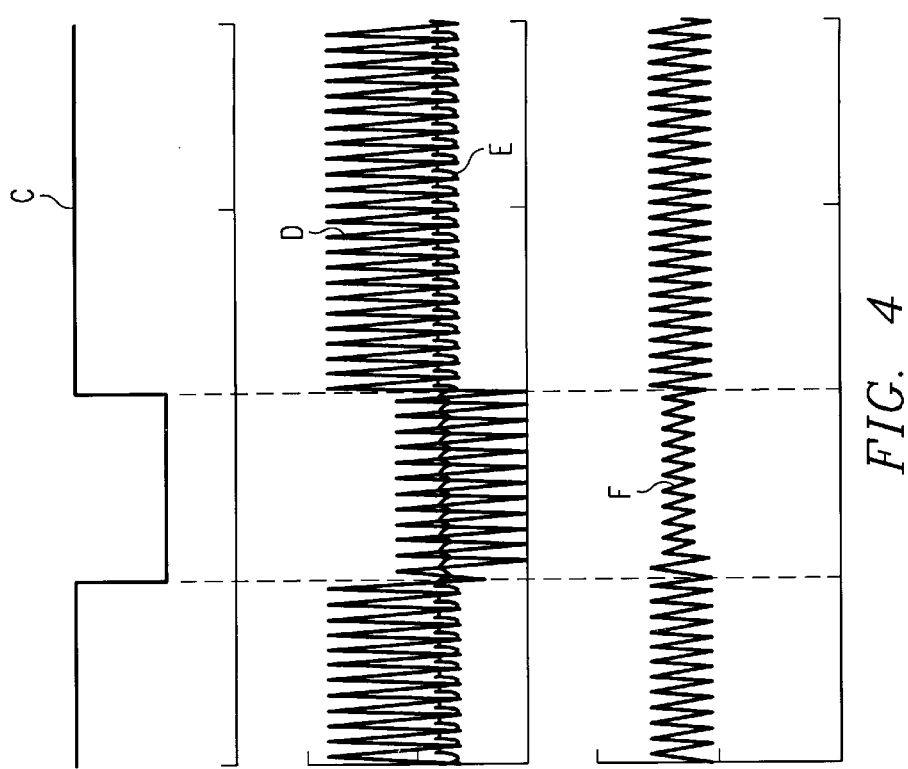
FIG. 4
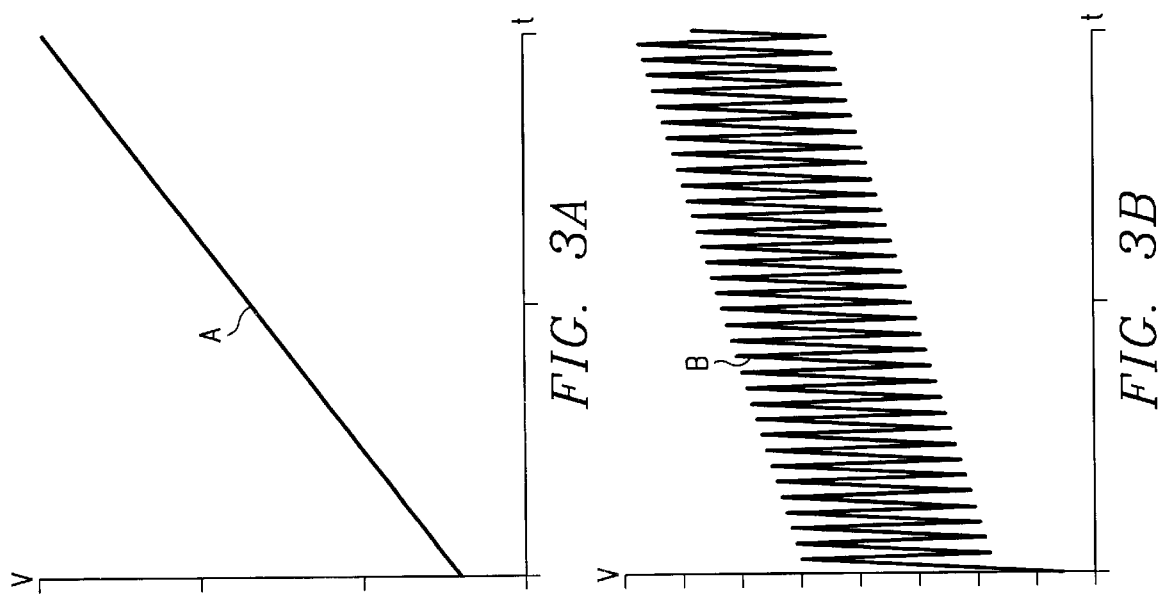
FIG. 3A
FIG. 3B

SWITCHING REGULATOR DRIVE SIGNAL CIRCUIT RESPONSIVE TO RAPID POWER SOURCE CHANGES FOR STABLE OUTPUT VOLTAGE

FIELD OF THE INVENTION

The present invention pertains to a drive signal supply circuit for a switching regulator. More specifically, the present invention pertains to a drive signal supply circuit for a switching regulator characterized by the fact that it produces a stable output voltage even for deviations of the power source voltage.

BACKGROUND OF THE INVENTION

Usually, a regulator is used as a device for supplying a stable DC voltage to a load.

An example of a conventional switching regulator is the switching regulator 101 shown in FIG. 13. Switching regulator 101 comprises switching transistor 102, rectifying/smoothing circuit 180, and controller 127 to be explained later.

Switching transistor 102 is an n-channel MOS transistor (hereinafter referred to as nMOSFET). Its drain terminal is connected to a power source voltage supply line that supplies power source voltage Vcc. Its gate terminal is connected to controller 127 to be explained later, and with this constitution switching transistor 102 can be turned ON/OFF corresponding to the output signal of controller 127.

Rectifying/smoothing circuit 180 comprises rectifying MOSFET 103, choke coil 105, and smoothing capacitor 106. The source terminal of switching transistor 102 is connected to one end of choke coil 105. The other end of choke coil 105 is connected to one end of smoothing capacitor 106, and, at the same time, this end is connected through output terminal 107 to one end of load 108. The other end of the load is grounded. The other end of smoothing capacitor 106 is grounded.

Rectifying MOSFET 103 is formed by an nMOSFET. Its drain terminal is connected to the source terminal of switching transistor 102, its source terminal is grounded, and its gate terminal is connected to controller 127. Its constitution is dependent on the output signal of controller 127, such that it is OFF when switching transistor 102 is ON, and it is ON when switching transistor 102 is OFF. Also, in the figure, 104 represents the internal parasitic diode of rectifying MOSFET 103.

In said switching regulator 101, when rectifying MOSFET 103 is OFF, switching transistor 102 is turned from OFF to ON. As a result, choke coil 105 is connected through switching transistor 102 to the power source voltage supply line, current flows in choke coil 105, and this current also flows through output terminal 107 into load 108.

In this state, if switching transistor 102 is turned OFF and rectifying MOSFET 103 is turned ON, an electromotive force is generated between the two terminals of choke coil 105. Due to this electromotive force, a negative voltage is asserted on the drain terminal of rectifying MOSFET 103. As a result, parasitic diode 104 inside rectifying MOSFET 103 is forward-biased, and the energy stored in choke coil 105 is supplied to load 108.

The ON/OFF state of said switching transistor 102 is controlled by the voltage output from driver 125 of controller 127 to be explained later, and switching transistor 102 is turned ON/OFF repeatedly. Here, the potential of output terminal 107 varies correspondingly. However, because smoothing capacitor 106 is connected in parallel to load 108, in company with the ON/OFF switching, there is repeated charging/discharging of said smoothing capacitor 106, so that the potential at output terminal 107 is smoothed. The smoothed voltage is output from output terminal 107 as an output voltage across load 108. While this output voltage is asserted on load 108, it is also input to controller 127.

Controller 127 comprises voltage dividing circuit 122, reference voltage generating source 119, error amplifier 111, comparator 112, sawtooth wave generating circuit 113, driver 125, and negative feedback circuit 128. Voltage dividing circuit 122 is composed of two resistors $121_1$ and $121_2$ which are connected in series between output terminal 107 and ground. The output voltage is input to voltage dividing circuit 122, and the output voltage is divided according to the resistance ratio of resistors $121_1$ and $121_2$ to generate a sampling voltage which is input to the inverting input terminal of error amplifier 111. Reference voltage generating source 119 is connected to the non-inverting input terminal of error amplifier 111, so that reference voltage Vref is input from reference voltage generating source 119. Between the output terminal of error amplifier 111 and the inverting input terminal, there is negative feedback circuit 128 formed by a series circuit of a resistor and a capacitor. From error amplifier 111, the voltage of the error difference between reference voltage Vref and the sampling voltage is amplified by a prescribed gain determined by the impedance of negative feedback circuit 128, and it is then output.

The output voltage of error amplifier 111 is input to the non-inverting input terminal of comparator 112. A sawtooth wave is input from sawtooth wave generating circuit 113 to the inverting output terminal of comparator 112. Comparator 112 compares the output voltage of error amplifier 111 and the sawtooth wave, and it outputs a pulse signal which defines the ON period of switching transistor 102.

Said driver 125 turns switching transistor 102 ON/OFF corresponding to the pulse signal. When the output voltage rises higher than a prescribed voltage value, the output is lowered. On the other hand, when the output voltage falls lower than a prescribed voltage value, the output voltage is raised by means of driver operation. By means of this operation, it is possible to keep the output voltage at a prescribed level.

Because the response speed of error amplifier 111 in said conventional switching regulator 101 is slow, when there are rapid fluctuations in power source voltage Vcc, it becomes impossible for error amplifier 111 to respond to these fluctuations, and the output voltage becomes unstable.

In FIG. 14, curves (J)-(M) show the operation waveforms of the various circuits that form conventional switching regulator 101 when power source voltage Vcc is constant.

Curve (J) represents the waveform of the sawtooth wave output from sawtooth wave generating circuit 113; curve (K) represents the output waveform of error amplifier 111; curve (L) represents the output waveform of comparator 112; curve (M) represents the waveform of the source terminal of switching transistor 102.

FIG. 15 is a diagram illustrating the operations of the various circuits when the power source voltage Vcc falls rapidly. In FIG. 15, curve (N) represents the waveform of power source voltage Vcc that falls rapidly; curve (O) represents the waveform of the output voltage from comparator 112; curve (P) represents the waveform of the source terminal potential of switching transistor 102; curve (Q) represents the waveform of the sawtooth wave; curve (R)

represents the output waveform of error amplifier 111; and curve (S) represents the waveform of the output voltage.

As can be seen, when the power source voltage Vcc falls rapidly according to curve (N), error amplifier 111 cannot respond to such a rapid change. Consequently, the output of error amplifier 111 becomes unstable, so that the output voltage also becomes unstable as shown in curve (S). It becomes stable again after the transition period $T_1$ shown in FIG. 15.

FIG. 16 illustrates the operations of the various circuits when power source voltage Vcc rises rapidly. In FIG. 16, curve (T) represents the waveform of power source voltage Vcc that rises rapidly, and curve (U) represents the waveform of the output voltage of comparator 112. Curve (V) represents the waveform of the source terminal potential of switching transistor 102; curve (W) represents the waveform of the sawtooth wave; curve (X) represents the waveform of the output of error amplifier 111; and curve (Y) represents the waveform of the output voltage.

As can be seen, when power source voltage Vcc rises rapidly according to curve (T), error amplifier 111 cannot respond to the rapid change of the power source voltage. As a result, as can be seen in curve (Y), peak voltage $V_{peak}$ is generated on the output voltage.

Thus, since it is impossible to respond to the rapid change in power source voltage Vcc, the output voltage of the switching regulator becomes unstable. This is a problem.

The purpose of the present invention is to solve the aforementioned problems of the conventional methods by providing a drive signal supply circuit for a switching regulator characterized by the fact that it can provide a stable output voltage even for deviations in the power source voltage.

SUMMARY OF THE INVENTION

One aspect of the invention is a drive supplycircuit which which supplies a drive signal to a switching transistor of a switching regulator comprising the switching transistor, a coil, a smoothing capacitor, and a flywheel diode, characterized by the following parts: a detecting circuit which detects the output voltage of the switching regulator; an error amplifier which compares the detection voltage output from said detecting circuit and a reference voltage, and which generates an error signal; a sawtooth wave signal generating circuit which generates a sawtooth wave signal; an amplitude center adjusting circuit which accepts said sawtooth wave signal as an input, which changes the amplitude center voltage of said sawtooth wave signal corresponding to the power source voltage, and which outputs an adjusted sawtooth wave signal; a comparator which compares said error signal and said adjusted sawtooth wave signal, and which generates a pulse signal for controlling the ON period of said switching transistor; and a driving circuit which generates a drive signal based on said pulse signal output from said comparator and which supplies the drive signal to said switching transistor.

Another aspect of the invention is the drive signal supply circuit the amplitude of said adjusted sawtooth wave signal is constant.

A futher aspect of the invention is a drive signal supply circuit which supplies a drive signal to a switching transistor of a switching regulator comprising the switching transistor, a coil, a smoothing capacitor, and a flywheel diode, characterized by the following parts: a detecting circuit which detects the output voltage of the switching regulator; an error amplifier which compares the detection voltage output from said detecting circuit and a reference voltage, and which generates an error signal; a sawtooth wave signal generating circuit which generates a sawtooth wave signal; an amplitude adjusting circuit which accepts said sawtooth wave signal as an input, which changes the amplitude of said sawtooth wave signal corresponding to the power source voltage and which outputs an adjusted sawtooth wave signal; a comparator which compares said error signal and said adjusted sawtooth wave signal, and which generates a pulse signal for controlling the ON period of said switching transistor; and a driving circuit which generates a drive signal based on said pulse signal output from said comparator and which supplies the drive signal to said switching transistor.

A still further aspect of the invention is a drive signal supply circuit where the amplitude center voltage of said adjusted sawtooth wave signal is constant.

Yet another aspect of the invention is a drive signal supply circuit which supplies a drive signal to a switching transistor of a switching regulator comprising the switching transistor, a coil, a smoothing capacitor, and a flywheel diode, characterized by the following parts: a detecting circuit which detects the output voltage of the switching regulator; an error amplifier which compares the detection voltage output from said detecting circuit and a reference voltage, and which generates an error signal; a sawtooth wave signal generating circuit which generates a sawtooth wave signal; an adjusting circuit which accepts said sawtooth wave signal as an input, which changes the amplitude center voltage of said sawtooth wave signal and the amplitude of said sawtooth wave signal corresponding to the power source voltage, and which outputs an adjusted sawtooth wave signal; a comparator which compares said error signal and said adjusted sawtooth wave signal, and which generates a pulse signal for controlling the ON period of said switching transistor; and a driving circuit which generates a drive signal based on said pulse signal output from said comparator and which supplies the drive signal to said switching transistor.

According to one aspect of the invention, switching regulator of the present invention comprises an amplitude center adjusting circuit. It detects the power source voltage, and, corresponding to the magnitude of the power source voltage, it changes the amplitude center voltage of the sawtooth wave signal and outputs this adjusted signal to the comparator.

Consequently, even when the power source voltage makes a rapid change, the center voltage of the sawtooth wave signal is raised/lowered at a high speed matching the rapid change, and it is output to the comparator. Consequently, the pulse signal output from the comparator can follow the rapid change in the power source voltage. Consequently, the output voltage can follow the rapid change in the power source voltage. As a result, it is possible to solve the problem of the prior art where the output voltage becomes unstable because it cannot follow the changes in the power source voltage.

Also, the overall gain of the switching regulator is a product of the gains of the error amplifier, comparator, and output section. The gain of the comparator is equal to (power source voltage)/(amplitude of the sawtooth wave signal), and it is directly proportional to variations in the power source voltage.

Consequently, since the power source voltage fluctuates in a conventional switching regulator, the gain of the comparator varies correspondingly, so that the overall gain of the switching regulator varies, and the output voltage is prone to noise. This is a problem.

However, another switching regulator of the present invention has an amplitude adjusting circuit, and corresponding to the magnitude of the power source voltage, the amplitude of the sawtooth wave signal is changed and output to the comparator.

Consequently, when the power source voltage becomes larger, the amplitude of the sawtooth wave signal also becomes larger. When the power source voltage becomes smaller, the amplitude of the sawtooth wave signal also becomes smaller. Consequently, the gain of the comparator equal to the ratio of the power source voltage to the amplitude of the sawtooth wave signal remains almost constant and thus, it is nearly independent of fluctuations in the power source voltage.

Consequently, even when the power source voltage varies, the overall gain of the switching regulator remains nearly constant. Consequently, there will be little noise in the output voltage.

BRIEF DESCRIPTION OF THE DRAWINGS

FIG. 3(a) is a diagram illustrating a rise in the power source voltage.

(b) is a diagram illustrating the output waveform of the amplitude center adjusting circuit in this embodiment in company with a rise in the power source voltage.

FIG. 4 is a waveform diagram illustrating the operation of the switching regulator in an embodiment of the present invention.

Figure 5:
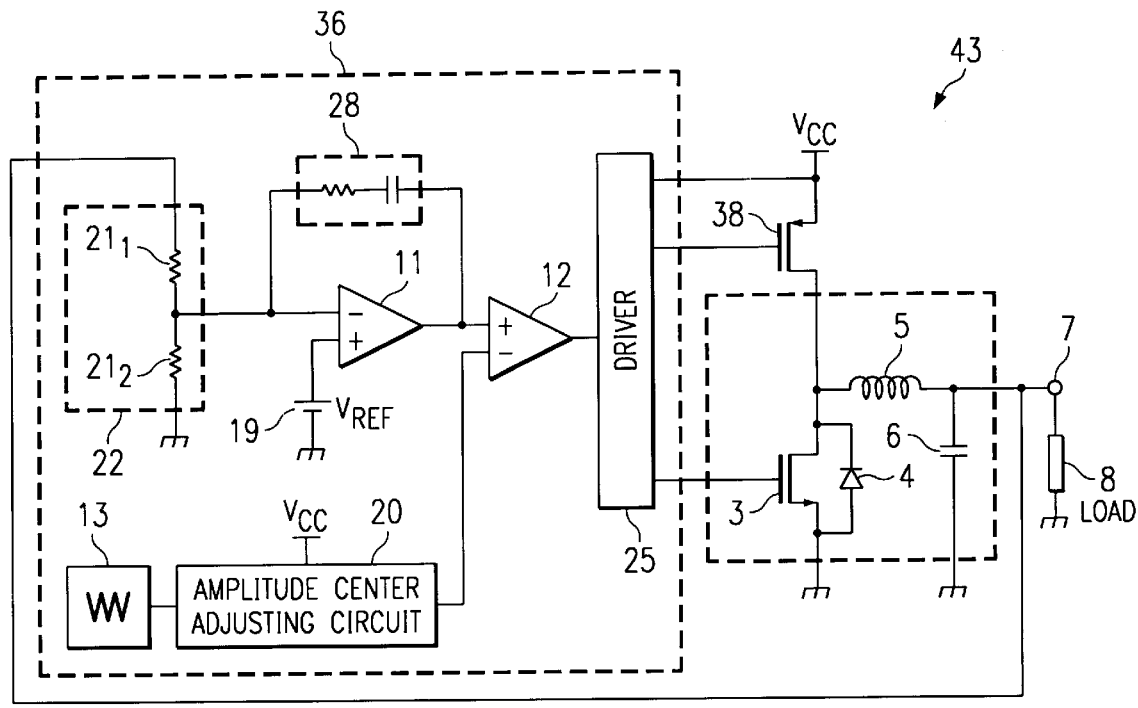

FIG. 5 is a circuit diagram illustrating an example in which a pMOSFET is used as the switching transistor in the switching regulator in an embodiment of the present invention.

Figure 6:
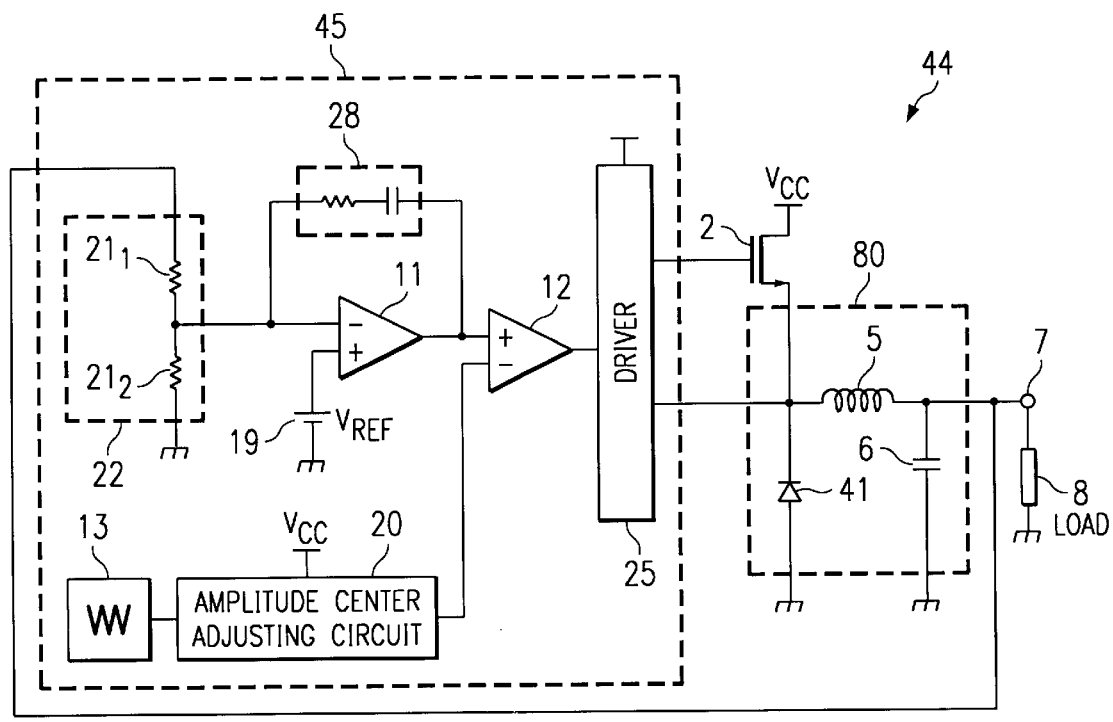

FIG. 6 is a circuit diagram illustrating an example in which just a diode is used as the rectifying element in the switching regulator in an embodiment of the present invention.

Figure 7:
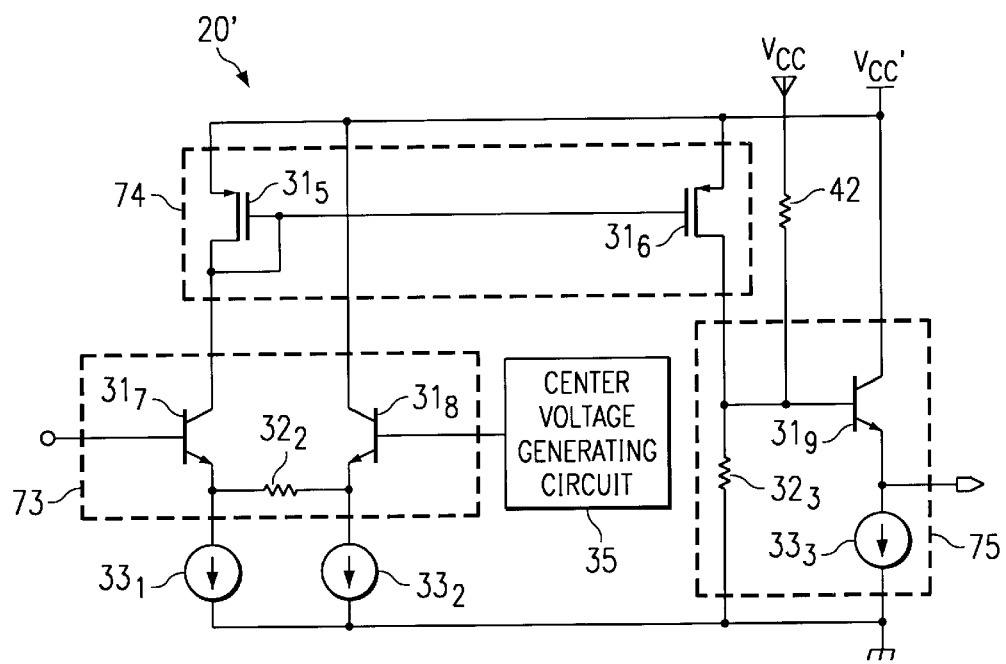

FIG. 7 is a circuit diagram illustrating another example of the amplitude center adjusting circuit in the switching regulator in an embodiment of the present invention.

Figure 8:
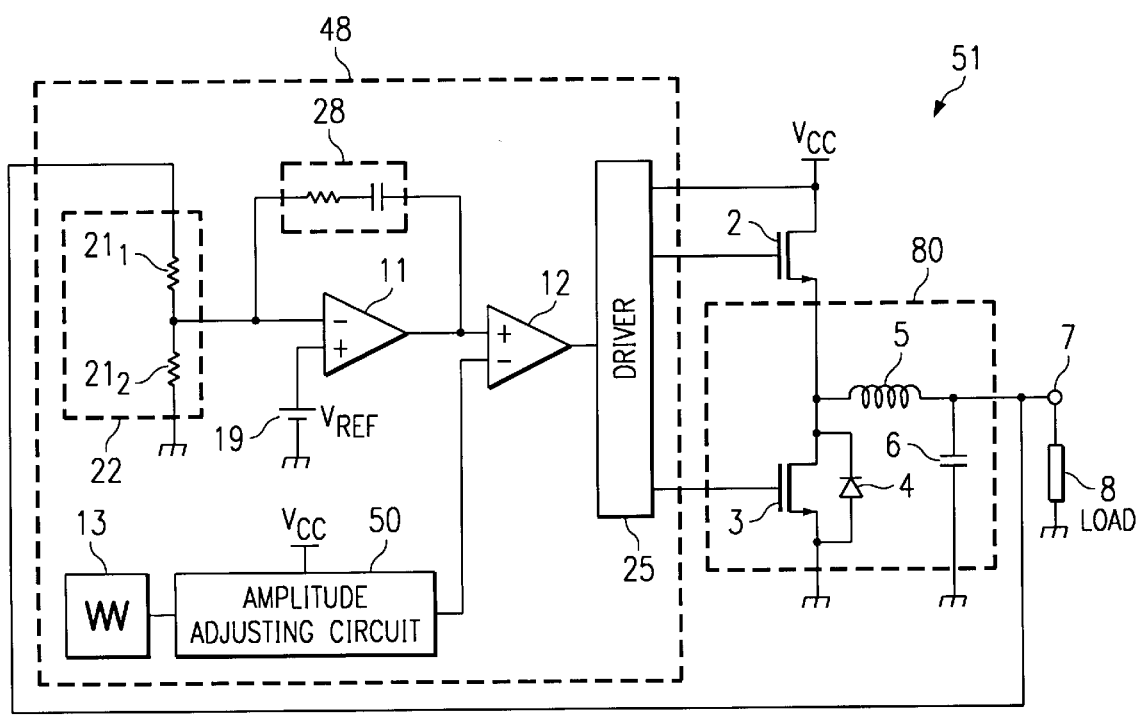

FIG. 8 is a circuit diagram illustrating the switching regulator in another embodiment of the present invention.

Figure 9:
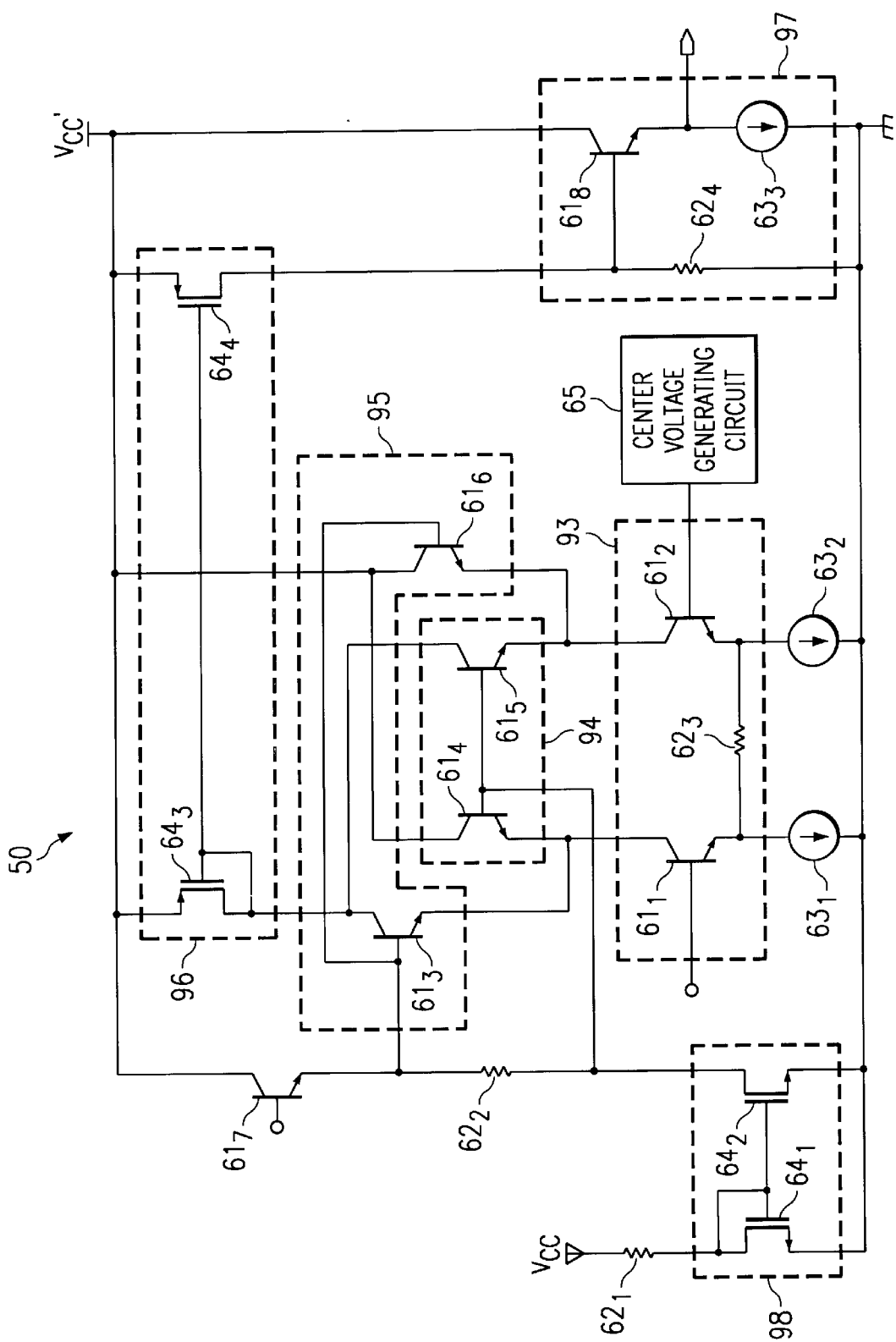

FIG. 9 is a circuit diagram illustrating the amplitude adjusting circuit in the switching regulator in another embodiment of the present invention.

Figure 10A:
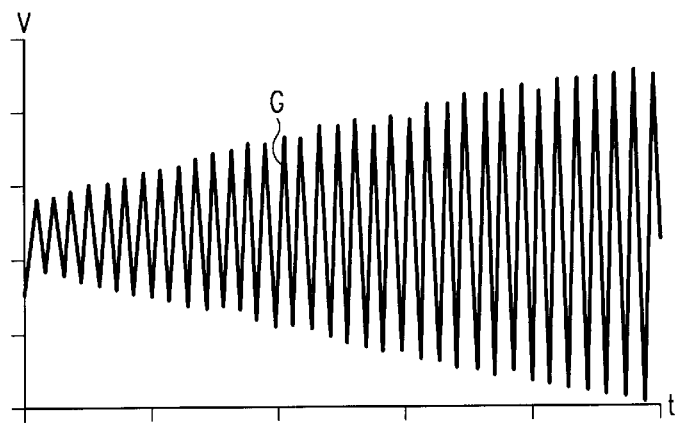

FIG. 10(a) is a diagram illustrating the output waveform of the amplitude adjusting circuit in this embodiment in company with a rise in the power source voltage.

(b) is a diagram illustrating a rise in the power source voltage.

Figure 11:
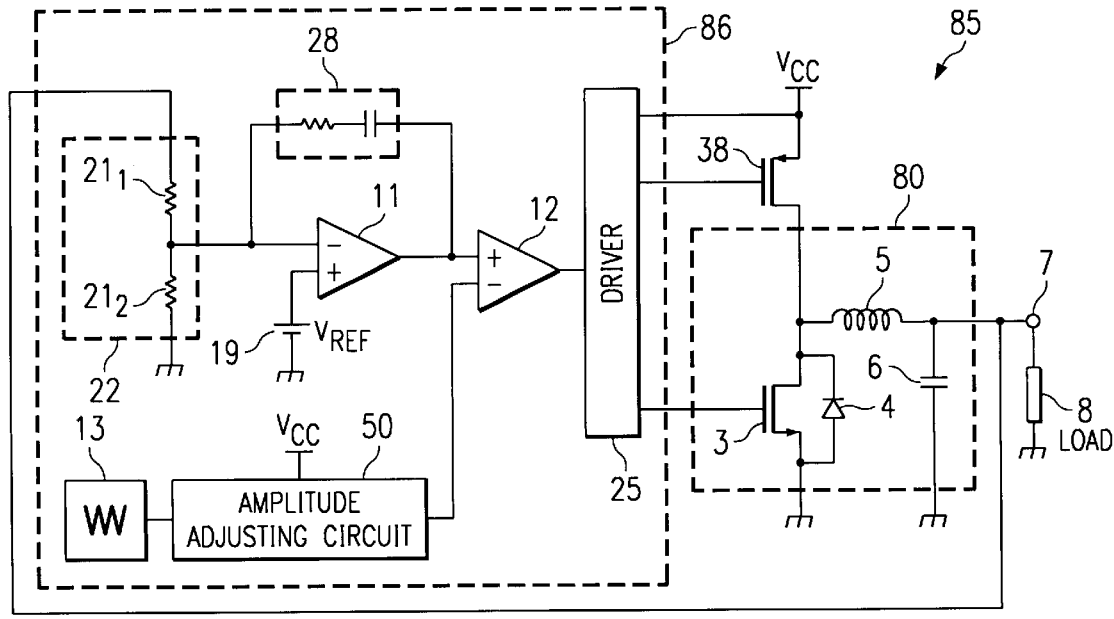

FIG. 11 is a circuit diagram illustrating an example in which a pMOSFET is used as the switching transistor in the switching regulator in another embodiment of the present invention.

Figure 12:
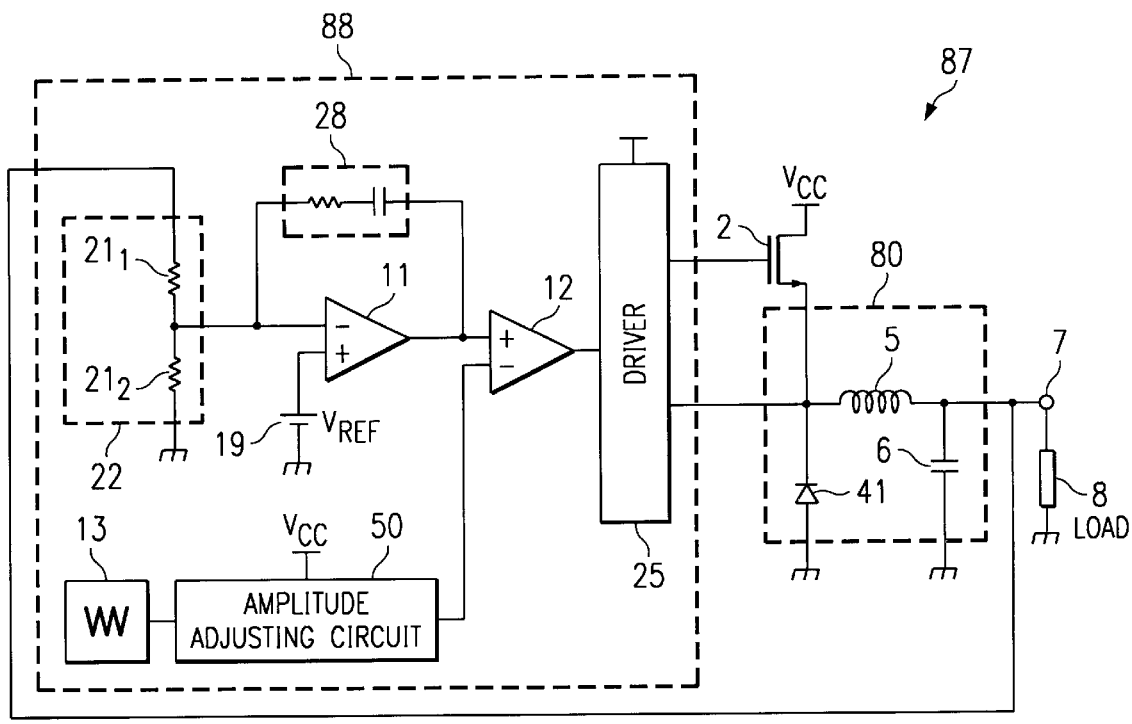

FIG. 12 is a circuit diagram illustrating an example in which just a diode is used as the rectifying element in the switching regulator in another embodiment of the present invention.

Figure 13:
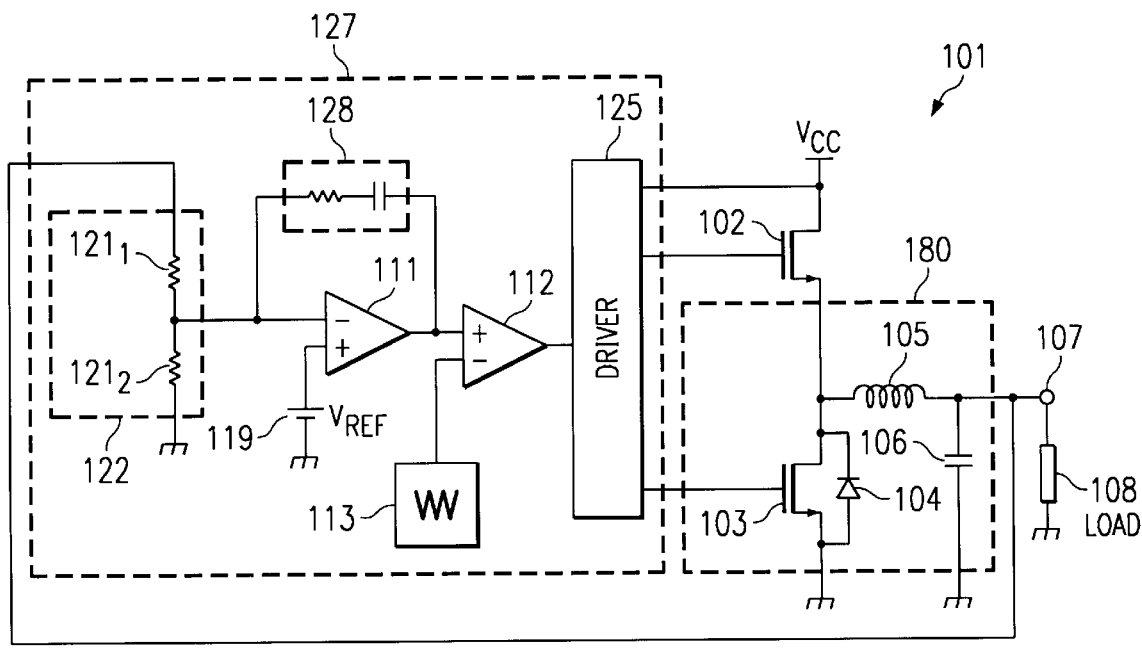

FIG. 13 is a circuit diagram illustrating a conventional switching regulator.

Figure 14:
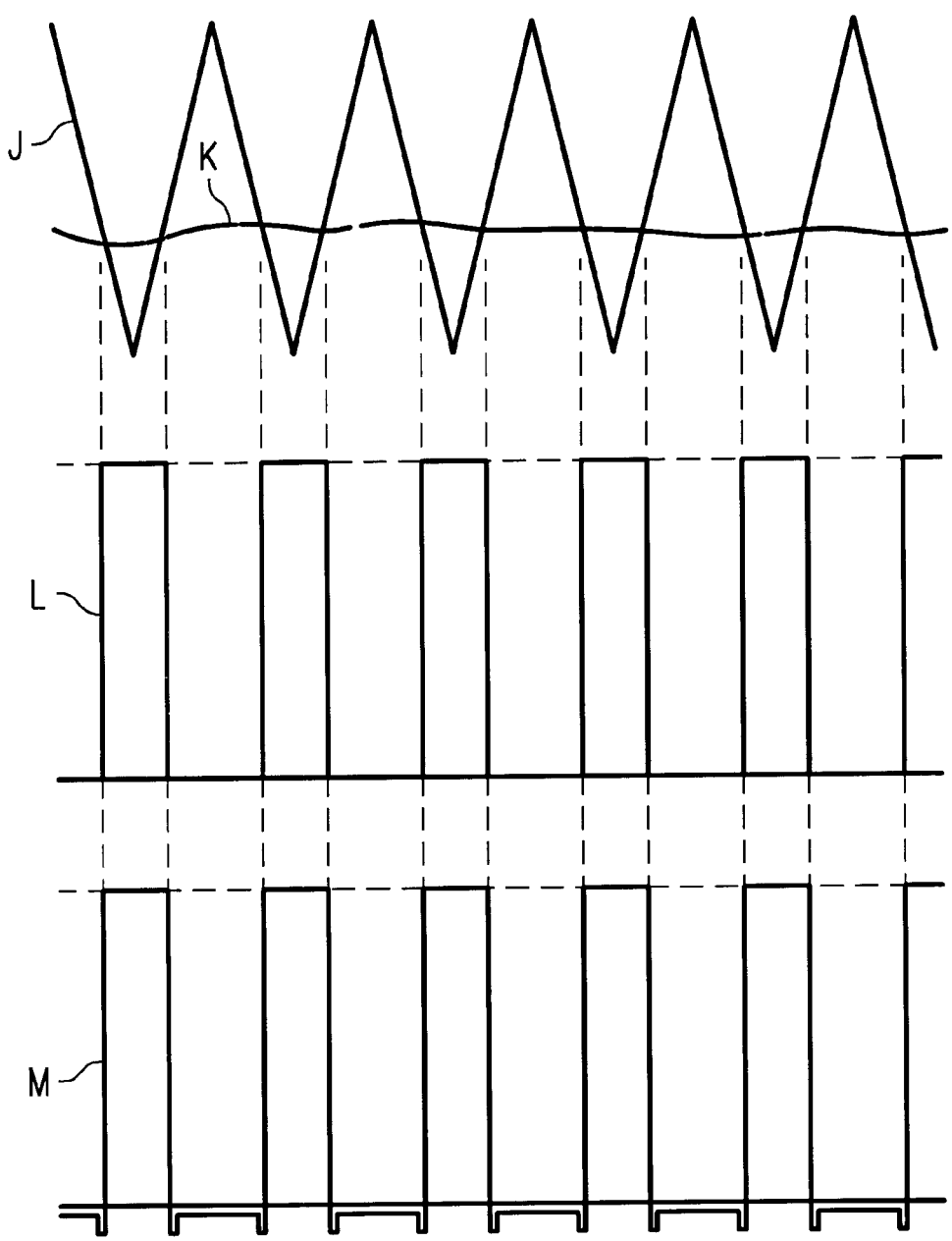

FIG. 14 is a diagram illustrating the operation of the conventional switching regulator when the power source voltage is constant.

Figure 15:
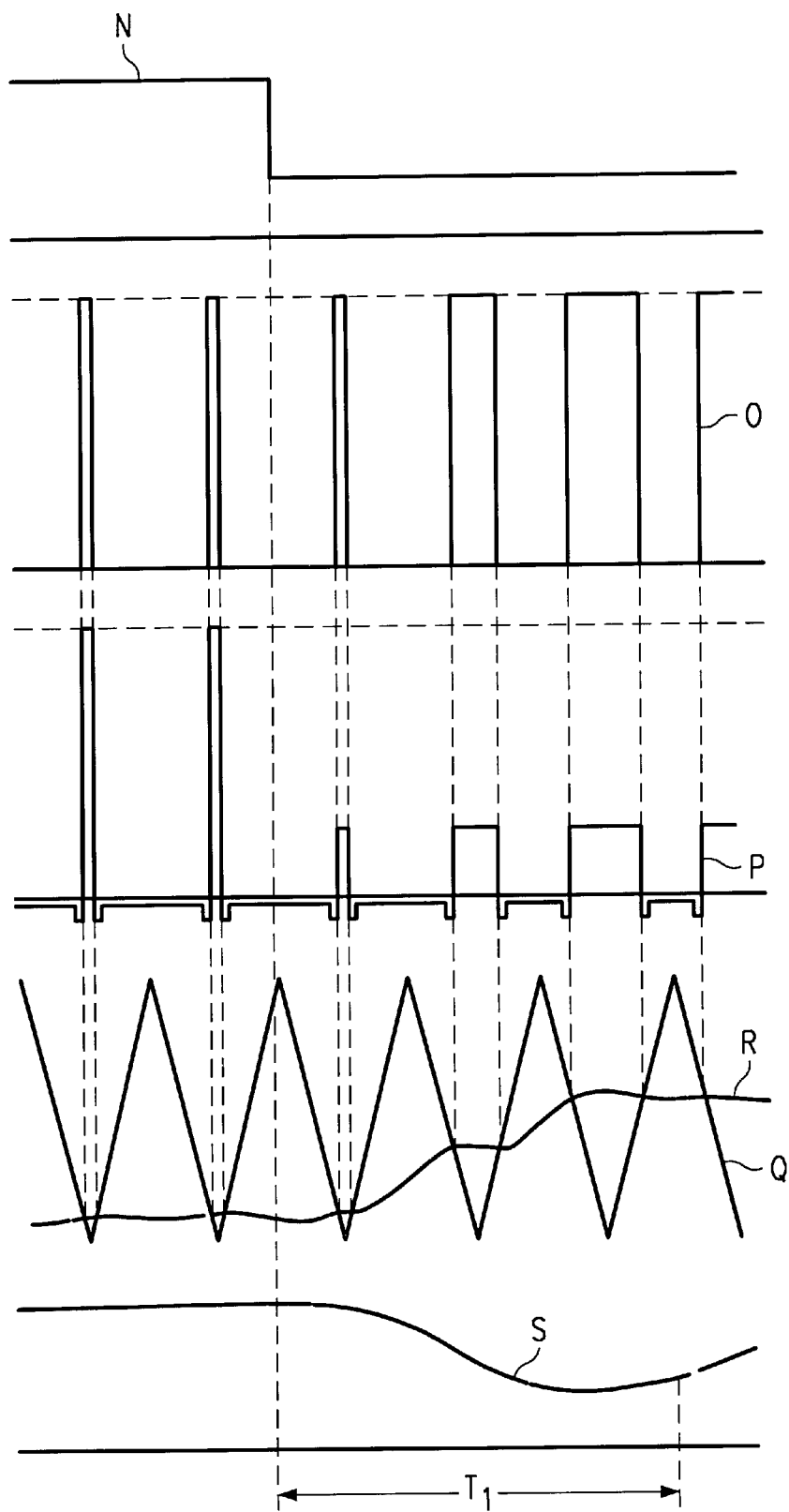

FIG. 15 is a diagram illustrating the operation of the conventional switching regulator when the power source voltage falls rapidly.

Figure 16:
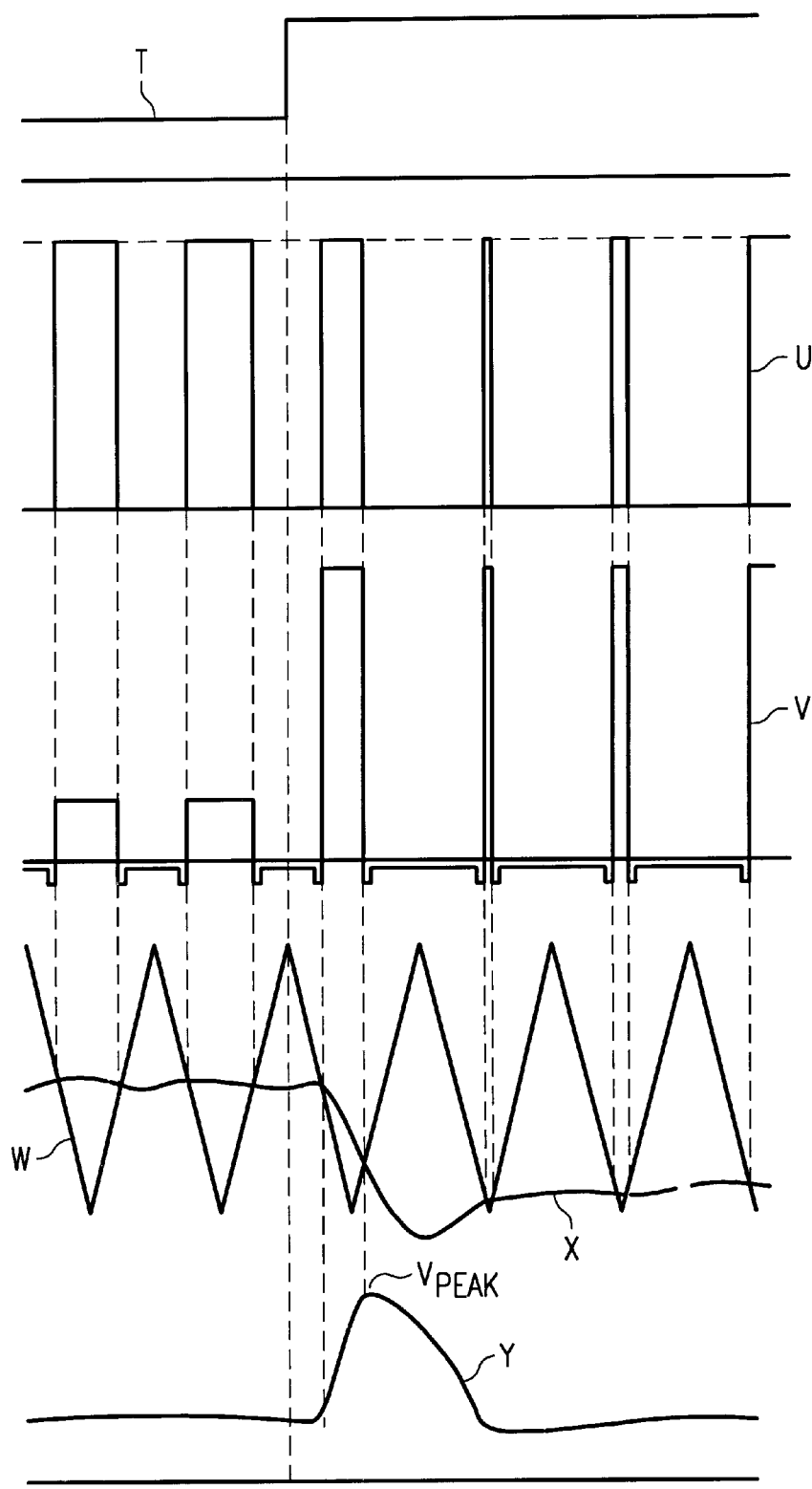

FIG. 16 is a diagram illustrating the operation of the conventional switching regulator when the power source voltage rises rapidly.

Figure 17:
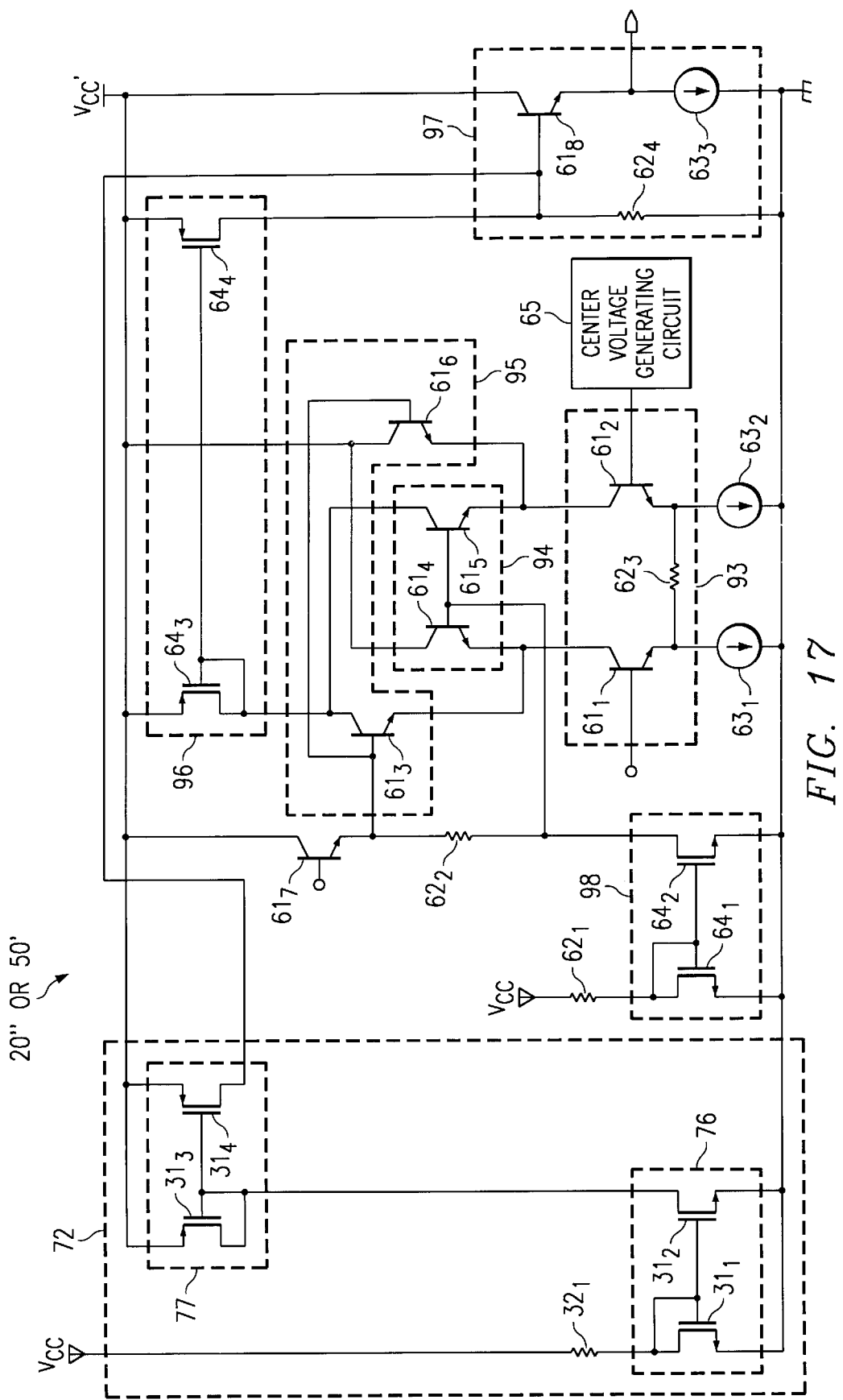

FIG. 17 is a circuit diagram illustrating the waveform adjusting circuit in this embodiment.

REFERENCE NUMERALS AND SYMBOLS AS SHOWN IN THE DRAWINGS

In the figures, 1 represents a switching regulator, 2 a switching transistor, 11 is an error amplifier, 12 a comparator, 20 an amplitude center adjusting circuit, 50 an amplitude adjusting circuit, and 80 a rectifying/smoothing circuit.

Description of the Embodiment

In the following, the embodiment of the present invention will be explained with reference to the figures.

Figure 1:
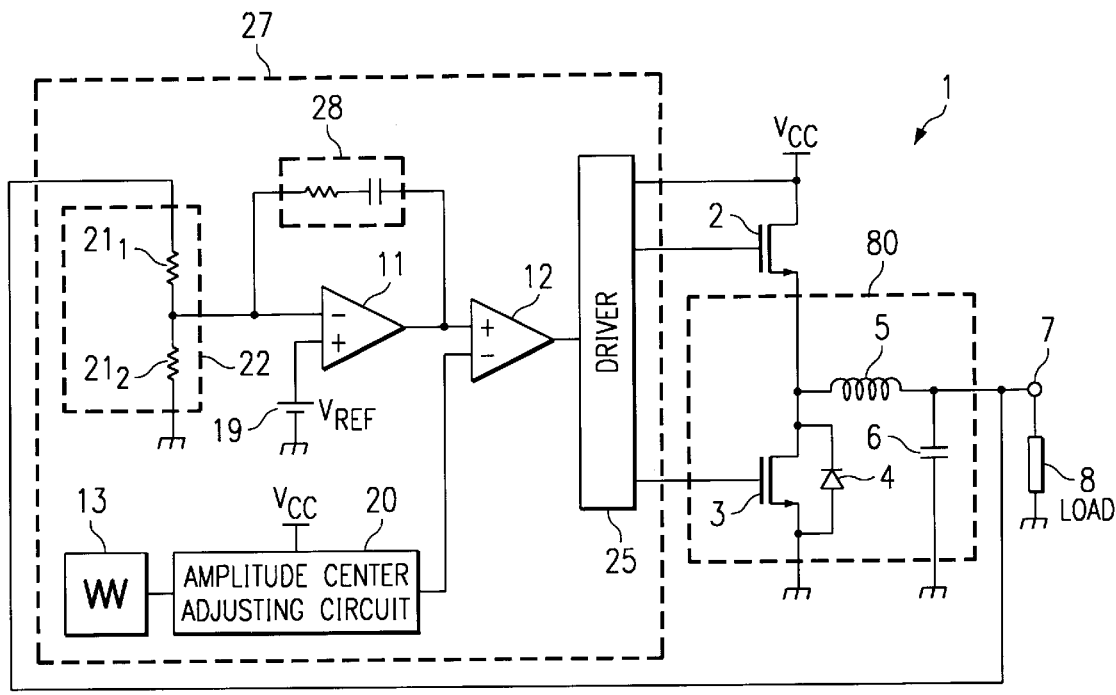
FIG. 1 is a circuit diagram illustrating an example of the switching regulator in an embodiment of the present invention.

In FIG. 1, 1 represents the switching regulator in this embodiment. This switching regulator 1 comprises switching transistor 2, rectifying/smoothing circuit 80, and controller 27 to be explained later.

Switching transistor 2 is made of n-channel MOS transistor (hereinafter referred to as nMOSFET). Its drain terminal is connected to a power source voltage supply line that supplies power source voltage Vcc. Its gate terminal is connected to controller 27, and switching transistor 2 can be turned ON/OFF according to the output signal of driver 25 of controller 27 to be explained later.

Rectifying/smoothing circuit 80 comprises rectifying MOSFET 3, choke coil 5 and smoothing capacitor 6. The source terminal of switching transistor 2 is connected to one end of choke coil 5. The other end of choke coil 5 is connected to one end of smoothing capacitor 6, and at the same time, this end is connected through output terminal 7 to one end of load 8. The other end of the load is grounded. The other end of smoothing capacitor 6 is grounded.

Rectifying MOSFET 3 formed by an nMOSFET. Its drain terminal is connected to the source terminal of switching transistor 2, its source terminal is grounded, its gate terminal is connected to controller 27, and it is turned ON/OFF according to the signal input from driver 25 of controller 27 to be explained later. In this case, when switching transistor 2 is ON, the rectifying MOSFET is OFF; when switching transistor 2 is OFF, the rectifying MOSFET is ON. In the figure, 4 represents the internal parasitic diode of rectifying MOSFET 3.

In said switching regulator 1, when rectifying MOSFET 3 is OFF, switching transistor 2 is turned ON from the OFF state. As a result, choke coil 5 is connected through switching transistor 2 to the power source voltage supply line, current flows in choke coil 5, and this current also flows through output terminal 7 into load 8.

In this state, if switching transistor 2 is turned OFF, and rectifying MOSFET 3 is turned ON, an electromotive force is generated between the two terminals of choke coil 5. Due to this electromotive force, a negative voltage is asserted on the drain terminal of rectifying MOSFET 3. As a result, internal diode 4 of rectifying MOSFET 3 is forward biased, and the energy stored in choke coil 5 is supplied to load 8.

The ON/OFF state of said switching transistor 2 is controlled by the voltage output from driver 25 of controller 27. As switching transistor 2 is turned ON/OFF repeatedly, the potential of output terminal 7 also varies correspondingly. Because smoothing capacitor 6 is connected in parallel to load 8, in company with the ON/OFF switching, there is repeated charging/discharging of smoothing, so that the potential at output terminal 7 is smoothed. The smoothed voltage is used as the output voltage, and it is applied from output terminal 7 across load 8. This output voltage is applied on load 8, and at the same time, it is also input to controller 27.

Controller 27 comprises voltage dividing circuit 22, reference voltage generating source 19, error amplifier 11, comparator 12, sawtooth wave generating circuit 13, amplitude center adjusting circuit 20, driver 25, and negative feedback circuit 28. Voltage dividing circuit 22 is composed of two resistors $21_1$ and $21_2$ which are connected in series between output terminal 7 and ground, and the output voltage is input to voltage dividing circuit 22. The output voltage is divided according to the resistance ratio of said resistors $21_1$ and $21_2$ to generate a sampling voltage that is input to the inverting input terminal of error amplifier 11. Reference voltage generating source 19 is connected to the non-inverting input terminal of error amplifier 11, and reference voltage Vref is input from reference voltage generating source 19. Negative feedback circuit 28 formed by a series circuit of a resistor and a capacitor is connected between the output terminal of error amplifier 11 and the inverting input terminal. From error amplifier 11, the voltage of the error difference between reference voltage Vref and the sampling voltage is amplified by a prescribed gain determined by the impedance of negative feedback circuit 28, and it is then output.

The output voltage of error amplifier 11 is output to the non-inverting input terminal of comparator 12. The output terminal of amplitude center adjusting circuit 20 is connected to the inverting input terminal of comparator 12.

Sawtooth wave generating circuit 13 is connected to the input terminal of amplitude center adjusting circuit 20, and a sawtooth wave at a prescribed frequency is generated by sawtooth wave generating circuit 13.

Figure 2:
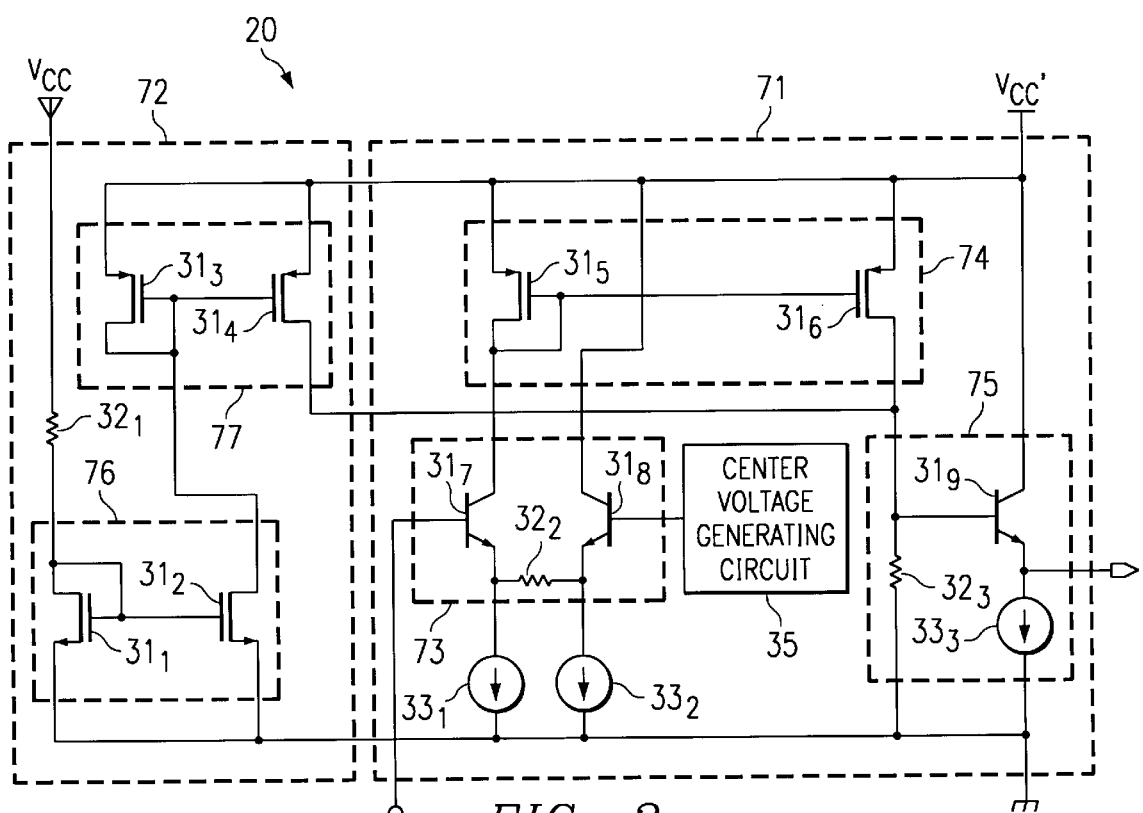
FIG. 2 is a circuit diagram illustrating an example of the amplitude center adjusting circuit in the present invention.

FIG. 2 is a diagram illustrating in detail the constitution of amplitude center adjusting circuit 20. Amplitude center adjusting circuit 20 comprises sawtooth wave shaping portion 71.

Sawtooth wave shaping portion 71 has differential amplifier 73, current mirror circuit 74, output circuit 75, and center voltage generating circuit 35.

Differential amplifier 73 has two NPN transistors $31_7$ and $31_8$. The emitter terminals of said NPN transistors $31_7$ and $31_8$ are connected to constant-current circuits $33_1$ and $33_2$, respectively. Also, the emitter terminals of NPN transistors $31_7$ and $31_8$ are connected to each other by resistor $32_2$.

Constant-current circuits $33_1$ and $33_2$ have a constitution such that an equal and constant current $I_0$ flows through them. In this case, since the two NPN transistors $31_7$ and $31_8$ have the same driving power, when the potentials at the base terminals of the two NPN transistors $31_7$ and $31_8$ are equal, the same current $I_0$ flows through both NPN transistors $31_7$ and $31_8$. As a result, the potential difference between the two ends of resistor $32_2$ is zero.

On the other hand, when the potential at the base terminal of either of the NPN transistors rises, the potential at the base terminal of the other NPN transistor falls, such that the current flowing through the NPN transistor experiencing the potential rise at the base terminal increases, and the current flowing through the NPN transistor experiencing the potential fall at the base terminal decreases.

Even in this case there is no change in the current flowing in constant-current circuits $33_1$ and $33_2$, so the increased current flows through resistor $32_2$ into the constant-circuit circuit connected to the emitter terminal of the NPN transistor with a lower potential at the base terminal.

Current mirror circuit 74 comprises two pMOSFETs $31_5$ and $31_6$, with pMOSFET 315 on one side strapped as a diode. The drain terminal of pMOSFET $31_5$ strapped as a diode is connected to the collector terminal of one NPN transistor $31_7$ from the two NPN transistors $31_7$ and $31_8$ of differential amplifier 73. Consequently, the collector current of NPN transistor $31_7$ on one side flows through pMOSFET $31_5$ on the side strapped as a diode.

The gate terminal of pMOSFET $31_5$ on the side strapped as a diode is connected to the gate terminal of pMOSFET $31_6$ on the side not strapped as a diode. A current with the same magnitude as that of the current flowing in pMOSFET $31_5$ on the side strapped as a diode also flows in pMOSFET $31_6$ on the side not strapped as a diode.

The drain terminal of pMOSFET $31_6$ on the side not strapped as a diode is connected to ground through resistor $32_3$ that forms output circuit 75 to be explained later, and current flowing in pMOSFET $31_6$ with the same magnitude as that of the collector current of one NPN transistor $31_7$ of differential amplifier 73 flows in resistor $32_3$. As a result, a voltage corresponding to the potential difference between the base terminals of two NPN transistors $31_7$ and $31_8$ of differential amplifier 73 appears across the terminals of resistor $32_3$.

The base terminals of NPN transistors $31_7$ and $31_8$ of said differential amplifier 73 are connected to sawtooth wave generating circuit 13 and center voltage generating circuit 35, respectively. A sawtooth wave at a prescribed frequency is output from sawtooth wave generating circuit 13 and a constant voltage is output from center voltage generating circuit 35. Consequently, the sawtooth wave input to differential amplifier 73 is waveform shaped such that its amplitude is kept between logical high power source voltage Vcc' and ground, with the center voltage at a prescribed level at the center, and the waveform shaped sawtooth wave (hereinafter referred to as pseudo-sawtooth wave) appears at the higher-voltage side of said resistor $32_3$.

In addition to said sawtooth wave shaping portion 71, amplitude center adjusting circuit 20 also comprises power source voltage detecting portion 72.

Said power source voltage detecting portion 72 comprises sink-side current mirror circuit 76, source-side current mirror circuit 77, and voltage detecting resistor $32_1$.

Sink-side current mirror circuit 76 comprises nMOSFET $31_1$ strapped as a diode and nMOSFET $31_2$ not strapped as a diode. The source terminals of said nMOSFETs $31_1$ and $31_2$ are grounded, and their gate terminals are connected to each other. nMOSFET $31_1$ strapped as a diode has its drain terminal connected through voltage detecting resistor $32_1$ to power source voltage supply line. Consequently, a current flows in nMOSFET $31_1$ strapped as a diode with a magnitude corresponding to power source voltage Vcc, and a current also flows in nMOSFET $31_2$ not strapped as a diode with a magnitude corresponding to power source voltage Vcc.

Source-side current mirror circuit 77 comprises pMOSFET $31_3$ strapped as a diode and pMOSFET $31_4$ not strapped as a diode. The drain terminal of nMOSFET $31_3$ on the side strapped as a diode is connected to the drain terminal of nMOSFET $31_2$ not strapped as a diode of sink-side current mirror circuit 76. Consequently, a current flows in nMOSFET $31_3$ strapped as a diode with a magnitude corresponding to power source voltage Vcc. The source terminals of pMOSFET $31_3$ and $31_4$ are connected to logical high power source voltage Vcc', and their gate terminals are connected to each other. A current also flows in pMOSFET $31_4$ not strapped as a diode with a magnitude corresponding to power source voltage Vcc.

The drain terminal of pMOSFET $31_4$ not strapped as a diode of source-side current mirror circuit 77 is connected to the higher-potential-side terminal of resistor $32_3$ of output circuit 75, and a current flows in resistor $32_3$ of output circuit 75 with a magnitude corresponding to power source voltage Vcc.

As explained above, a pseudo-sawtooth wave appears at the higher-potential-side terminal of resistor $32_3$ of output circuit 75. A current with a magnitude corresponding to power source voltage Vcc flows into resistor $32_3$. Consequently, the voltage appearing at the higher-potential-side terminal of resistor $32_3$ is a voltage formed by a DC voltage with a magnitude corresponding to power source voltage Vcc superimposed on the pseudo-sawtooth wave. As a result, a sawtooth wave with an amplitude center voltage that changed corresponding to the magnitude of power source voltage Vcc is obtained.

In addition to said resistor $32_3$, output circuit 75 also comprises output transistor $31_9$ and constant-current circuit $33_3$. Output transistor $31_9$ has its base terminal connected to the higher-potential-side terminal of resistor $32_3$, its collector terminal connected to the logical high power source voltage Vcc', and its emitter terminal connected through constant-current circuit $33_3$ to ground. At the higher-potential-side terminal of resistor $32_3$ is a sawtooth wave with an amplitude center voltage that varies corresponding to the magnitude of power source voltage Vcc as explained above. This sawtooth wave is asserted on the base terminal of output transistor $31_9$, and it is amplified by output transistor $31_9$. Then, it is output from the emitter terminal of output transistor $31_9$ to said comparator 12.

FIGS. 3(a) and (b) are graphs illustrating the operation of amplitude center adjusting circuit 20. In FIG. 3(a), curve (A) shows power source voltage Vcc that rises over time. In FIG. 3(b), curve (B) shows the output voltage of amplitude center adjusting circuit 20 corresponding to the rise of power source voltage Vcc. As can be seen from curve (B) in FIG. 3(b), as power source voltage Vcc rises, there is no variation in the amplitude or frequency of the sawtooth wave, while just the amplitude center voltage rises.

As explained above, the output voltage of error amplifier 11 is input to the non-inverting input terminal of comparator 12. The sawtooth wave with an amplitude center voltage that varies corresponding to power source voltage Vcc is input from amplitude center adjusting circuit 20 to the inverting input terminal of comparator 12. Comparator 12 compares the output voltage of error amplifier 11 with the sawtooth wave with an amplitude center voltage that varies corresponding to power source voltage Vcc, and it outputs a pulse signal that defines the ON period of switching transistor 2. In this case, when the output voltage of error amplifier 11 is higher than the sawtooth wave, the pulse signal is output, and switching transistor 2 is ON. This pulse signal is output to driver 25.

Said driver 25 applies a voltage corresponding to the pulse signal to the gate terminal of switching transistor 2. As a result, switching transistor 2 is turned ON/OFF corresponding to the pulse signal.

As explained above, in this embodiment, during the period when the output voltage of error amplifier 11 is higher than the sawtooth wave, switching transistor 2 is ON. Then, as the output voltage rises to a value that exceeds a prescribed voltage, the output voltage of error amplifier 11 decreases, and the period where the output voltage of error amplifier 11 is greater than the sawtooth wave becomes shorter. Consequently, the pulse width of the pulse signal becomes shorter, and the output voltage falls. On the other hand, when the output voltage falls below a prescribed voltage value, the output voltage of error amplifier 11 rises, the pulse width of pulse signal becomes longer, and the output voltage rises. By means of such operation, the output voltage is maintained at a constant value.

For the conventional switching regulator, the response speed of the error amplifier is slow. Consequently, if there is a rapid change in the power source voltage Vcc, the error amplifier just cannot respond to the rapid change, so that the output voltage becomes unstable. Now, for said amplitude center adjusting circuit 20, because power source voltage Vcc is detected by resistors and current mirror circuits, and the controlled object is not the error amplifier 11, even if there is a rapid change in power source voltage Vcc, the center voltage of the sawtooth wave is changed at a high speed matching to the rapid change and is output to comparator 12.

Consequently, even if there is a rapid change in power source voltage Vcc, the sawtooth wave having a center voltage that varies at a high speed matching the rapid change in the power source voltage is input to comparator 12. Consequently, the pulse signal output from comparator 12 can follow the rapid changes in the power source voltage. Consequently, the problem of unstable output voltage due to the failure to follow fluctuations in the power source voltage Vcc can be solved.

FIG. 4 is a diagram illustrating the waveform of the operation of amplitude center adjusting circuit 20. In FIG. 4, curve (C) illustrates the waveform of power source voltage Vcc that first falls rapidly and then rises rapidly. Curve (D) illustrates the output waveform of the sawtooth wave output from amplitude center adjusting circuit 20. Curve (E) illustrates the output voltage of error amplifier 11. Also, curve (F) in FIG. 4 illustrates the output voltage of switching regulator 1 in this embodiment.

When power source voltage Vcc first falls rapidly and then rises rapidly, as shown in curve (D), the amplitude center voltage of the sawtooth wave varies corresponding to the fluctuations in the power source voltage Vcc. Consequently, as shown in curve (E), the amplitude of the output voltage of error amplifier 11 is kept almost at a constant level independent of the fluctuations in the power source voltage Vcc. Also, the output voltage of switching regulator 1 is kept within a nearly constant range and it remains stable as shown in curve (F).

In said switching regulator 1, switching transistor 2 is formed by an nMOSFET. However, the present invention is not limited to this type. As indicated by 43 in FIG. 5, it is also possible to use a pMOSFET as switching transistor 38.

In addition, as indicated by 44 in FIG. 6, it is also possible to use diode 41 as the rectifying element instead of rectifying MOSFET 3.

Also, the constitution of amplitude center adjusting circuit 20 is not limited to the constitution shown in FIG. 2, where the power source voltage Vcc is detected by a current mirror circuit. For example, as indicated by 20' in FIG. 7, the amplitude center adjusting circuit may also have the following constitution: one resistor 42 is inserted between the base terminal of output transistor $31_9$ and the power source voltage terminal, and resistor 42 alone is used to detect the power source voltage Vcc.

For the conventional switching regulator, when there are fluctuations in the power source voltage Vcc, the overall gain of the switching regulator varies corresponding to the fluctuations in the power source voltage. This is undesirable.

As a result, for example, when the power source voltage rises, the overall gain of the switching regulator increases, and it is prone noise which can be easily transferred to the output voltage. On the other hand, when the power source voltage falls, the overall gain of the switching regulator decreases. Consequently, the reaction becomes slower, and the precision falls. This is also undesirable.

In consideration of the aforementioned facts, the inventors of the present invention created switching regulator 51 shown in FIG. 8.

As shown in FIG. 8, said switching regulator 51 has nearly the same constitution as that of switching regulator 1. However, it differs from that shown in FIG. 1 in that it also has amplitude adjusting circuit 50. Said amplitude adjusting circuit 50 is inserted between sawtooth wave generating circuit 13 and comparator 12 in place of amplitude center adjusting circuit 20. This is the feature that differs from switching regulator 1 shown in FIG. 1.

FIG. 9 is a diagram illustrating in detail this amplitude adjusting circuit 50.

This amplitude adjusting circuit 50 comprises differential amplifier 93, load circuit 94, voltage amplifier 95, current mirror circuit 96, output circuit 97, and bias current setting resistor $62_2$. Said differential amplifier 93 comprises two NPN transistors $61_1$ and $61_2$. Emitter terminals of NPN transistors $61_1$ and $61_2$ are connected to constant-current circuits $63_1$ and $62_2$, respectively. Also, the emitter terminals of NPN transistors $61_1$ and $61_2$ are connected to each other by resistor $62_3$.

Constant-current circuits $63_1$ and $63_2$ have a constitution that allows a constant current $I_0$ to flow in each circuit. In this case, since two NPN transistors $61_1$ and $61_2$ have the same driving power, when the potentials of the base terminals of two NPN transistors $61_1$ and $61_2$ are equal, the same current $I_0$ flows in said NPN transistors $61_1$ and $61_2$. As a result, the potential difference between the two ends of resistor $32_2$ is zero.

On the other hand, when the potential of the base terminal of either of said NPN transistors rises, the potential of the base terminal of the other NPN transistor falls, so that the current flowing in the NPN transistor experiencing the potential rise at the base terminal increases. At the same time, the current flowing in the NPN transistor experiencing the potential fall at the base terminal decreases.

Even in this case, there is no change in the current flowing through constant-current circuits $63_1$ and $63_2$. Consequently, the increased current flows through resistor $62_3$ to the constant-current circuit on the side connected to the emitter terminal of the NPN transistor on the side with a lower potential at the base terminal.

Load circuit 94 comprises two NPN transistors $61_4$ and $61_5$. These NPN transistors $61_4$ and $61_5$ have their base terminals connected. The emitter terminals of these NPN transistors are connected to the collector terminals of NPN transistors $61_1$ and $61_2$, respectively, of differential amplifier 93. The collector currents flowing in NPN transistors $61_1$ and $61_2$ of differential amplifier 93 flow in NPN transistors $61_4$ and $61_5$, respectively. In this case, the currents flowing in NPN transistors $61_4$ and $61_5$ of load circuit 94 are labeled $I_{b1}$ and $I_{b2}$, respectively.

Also, voltage amplifier 95 has two NPN transistors $61_3$ and $61_6$. The base terminals of said NPN transistors $61_3$ and $61_6$ are connected to each other, and their emitter terminals are connected to the collector terminals of NPN transistors $61_1$ and $61_2$, respectively, of differential amplifier 93. Collector currents flowing in NPN transistors $6_1$ and $61_2$ of differential amplifier 93 flow in NPN transistors $61_3$ and $61_6$, respectively. In this case, the currents flowing in NPN transistors $61_3$ and $61_6$ of voltage amplifier 95 are labeled $I_{a1}$ and $I_{a2}$, respectively.

Consequently, when collector currents flow in two NPN transistors $61_1$ and $61_2$ of differential amplifier 93, these collector currents are supplied from NPN transistors $61_4$, $61_5$, $61_3$, and $61_6$.

When the potentials of the base terminals of NPN transistors $61_1$ and $61_2$ of differential amplifier 93 are equal, since the collector current of one NPN transistor $61_1$ is equal to the constant current $I_0$ flowing through constant-current circuit $63_1$, there is the following relationship:

$$I_{a1}+I_{b1}=I_0 \tag{1}$$

Similarly, since the collector current of the other NPN transistor $61_2$ is equal to the constant current 10 flowing through constant-current circuit $63_2$, there is the following relationship:

$$I_{a2}+I_{b2}=I_0 \tag{2}$$

Subtracting said formula (2) from said formula (1), one obtains:

$$I_{b1}-I_{b2}=I_{a2}-I_{a1} \tag{3}$$

In this case, for NPN transistors $61_4$ and $61_5$ of load circuit 94, since the potentials of their emitter terminals are equal, and the potentials of their base terminals are also equal, there is the following relationship:

$$I_{b1}-I_{b2}=0 \tag{4}$$

By substituting said formula (4) into said formula (3), one obtains:

$$I_{a1}-I_{a2}=0 \tag{5}$$

From said formulas (4) and (5), one can see that when the base terminals of NPN transistors $61_1$ and $61_2$ of differential amplifier 93 are at the same potential, currents $I_{a1}$ and $I_{a2}$ flowing in NPN transistors $61_3$ and $61_6$ of voltage amplifier 95 are equal, and currents $I_{b1}$ and $I_{b2}$ flowing in NPN transistors $61_4$ and $61_5$ of load circuit 94 are equal.

When there is equal potential at the base terminals of NPN transistors $61_1$ and $61_2$ of differential amplifier 93, the voltage at the base terminal of one NPN transistor $61_1$ of differential amplifier 93 rises, and the voltage at the base terminal of the other NPN transistor $61_2$ falls, so that the collector current of NPN transistor $61_1$ with the higher potential at the base terminal rises, and the collector current of NPN transistor $61_2$ with the lower potential at the base terminal falls.

Consequently, the current flowing in NPN transistors $61_3$ and $61_4$ having emitter terminals connected to NPN transistor $61_1$ with rising collector current increases, while the current flowing in NPN transistors $61_5$ and $61_6$ having emitter terminals connected to NPN transistor $61_2$ with falling collector current decreases.

Current mirror circuit 96 has two pMOSFETs $64_3$ and $64_4$. One pMOSFET $64_3$ is strapped as a diode. The drain terminal of pMOSFET $64_3$ strapped as a diode is connected to the collector terminal of NPN transistor $61_3$ with rising current in voltage amplifier 95, and to the collector terminal of NPN transistor $61_5$ with falling current in load circuit 94.

In this case, if the increase in current for two NPN transistors $61_3$ and $61_6$ of voltage amplifier 95 is $\Delta Ia$, and the decrease in current is $-\Delta Ia$, and if the increase in current is $\Delta Ib$ and the decrease in current is $-\Delta Ib$ for two NPN transistors $61_4$ and $61_5$ of load circuit 94, the variation in the current of pMOSFET $64_3$ strapped as a diode in current mirror circuit 96 is ($\Delta Ia-\Delta Ib$).

Amplitude adjusting circuit 50 comprises NPN transistor $61_7$ that supplies the base potential for two NPN transistors $61_3$ and $61_6$ of voltage amplifier 95, and the base potential for two NPN transistors $61_4$ and $61_5$ of load circuit 94. The collector terminal of this NPN transistor $61_7$ is connected to logical high power source voltage Vcc', and its emitter terminal is connected to the base terminals of two NPN transistors $61_3$ and $61_6$ of voltage amplifier 95. This emitter terminal is also connected through bias current setting resistor $62_2$ to the base terminals of two NPN transistors $61_4$ and $61_5$ of load circuit 94.

When a prescribed voltage is asserted on the base terminal of NPN transistor $61_7$, a current flows in bias current setting resistor $62_2$, and a potential difference appears across the two ends of the resistor. In this case, the base potentials of two NPN transistors $61_3$ and $61_6$ of voltage amplifier 95 become higher than the base potentials of two NPN transistors $61_4$ and $61_5$ of load circuit 94.

Consequently, if the driving powers of NPN transistors $61_3$–$61_6$ of voltage amplifier 95 and load circuit 94 are all equal, the bias currents of two NPN transistors $61_3$ and $61_6$ of voltage amplifier 95 must be larger than the bias currents of two NPN transistors $61_4$ and $61_5$ of load circuit 94.

Since the fluctuations in the current flowing in pMOSFET $64_3$ strapped as a diode of current mirror circuit 96 are proportional to the magnitude of the bias current, ($\Delta I_a-\Delta I_b$) is positive, and the current in said pMOSFET $64_3$ strapped as a diode rises.

On the other hand, when the potential of the base terminal of one NPN transistor $61_1$ of differential amplifier 93 falls while the potential of the base terminal of other NPN transistor $61_2$ rises, ($\Delta I_a-\Delta I_b$) becomes negative. Consequently, the current in said pMOSFET $64_3$ strapped as a diode falls. In this way, there are fluctuations in the current flowing in pMOSFET $64_3$ strapped as a diode of current mirror circuit 96. The fluctuation rate of the current is proportional to the difference between the bias current of the two NPN transistors $61_3$ and $61_6$ of voltage amplifier 95 and the bias current of the two NPN transistors $61_4$ and $61_5$ of load circuit 94. The difference in these bias currents is determined by the potential difference generated between the two ends of bias current setting resistor $62_2$.

The gate terminal of pMOSFET $64_3$ strapped as a diode of current mirror circuit 96 is connected to the gate terminal of the other pMOSFET $64_4$ of current mirror circuit 96. A current flows in said pMOSFET $64_4$ with the same magnitude as that flowing in pMOSFET $64_3$ strapped as a diode.

The drain terminal of pMOSFET $64_4$ is connected to one end of resistor $62_4$ of output circuit 97 to be explained later, and the current flowing in pMOSFET $64_4$ flows in resistor $62_4$. The other end of resistor $62_4$ is grounded. A voltage corresponding to the current flowing in resistor $62_4$ appears at the higher-potential-side end of resistor $62_4$. The voltage appearing at the higher-potential-side end of resistor $62_4$ is obtained by amplifying the difference between the voltages asserted on the base terminals of two NPN transistors $61_1$ and $61_2$ of differential amplifier 93 by an amplification rate corresponding to the potential difference generated between the two ends of bias current setting resistor $62_2$.

The base terminals of NPN transistors $61_1$ and $61_2$ of differential amplifier 93 are connected to sawtooth wave generating circuit 13 and center voltage generating circuit 65, respectively. A sawtooth wave at a prescribed frequency is output from sawtooth wave generating circuit 13, and a constant voltage is output from center voltage generating circuit 65. Consequently, a voltage appears at the higher-potential-side end of resistor $62_4$ of output circuit 97. This voltage is obtained by amplifying the amplitude of the sawtooth wave input to differential amplifier 93 with an amplification rate corresponding to the potential difference generated between the two ends of bias setting resistor $62_2$. In the following, this voltage will be referred to as a pseudo-sawtooth wave.

If the potential difference generated between the two ends of bias setting resistor $62_2$ is constant, the amplitude of the pseudo-sawtooth wave is constant. Amplitude adjusting circuit 50 also comprises voltage detecting resistor $62_1$ and current mirror circuit 98.

Current mirror circuit 98 comprises two nMOSFETs $64_1$ and $64_2$. One nMOSFET $64_1$ is strapped as a diode. The drain terminal of said nMOSFET $64_1$ strapped as a diode is connected through current detecting resistor $62_1$ to power source voltage Vcc. Consequently, a current flows in nMOSFET $64_1$ strapped as a diode that is larger than the current corresponding to the power source voltage Vcc. Two nMOSFETs $64_1$ and $64_2$ have their gate terminals connected to each other. A current flows in nMOSFET $64_2$ not strapped as a diode that is also larger than the current corresponding to power source voltage Vcc.

The drain terminal of nMOSFET $64_2$ not strapped as a diode is connected to the lower-potential-side terminal of bias setting resistor $62_2$. As a result, a current flows between the two ends of bias setting resistor $62_2$ with a magnitude corresponding to power source voltage Vcc, and a potential difference with a magnitude corresponding to power source voltage Vcc is generated between the two ends.

As explained above, the amplitude of the pseudo-sawtooth wave is amplified by an amplification rate corresponding to the potential difference generated across the two ends of bias setting resistor $62_2$, and the potential difference generated across the two ends of bias setting resistor $62_2$ varies corresponding to power source voltage Vcc. Consequently, when power source voltage Vcc rises, the amplification rate becomes higher. On the other hand, when power source voltage Vcc falls, the amplification rate becomes lower. As a result, a sawtooth wave with a larger amplitude when power source voltage Vcc is higher and with a smaller amplitude when power source voltage Vcc is lower appears at the higher-potential-side terminal of resistor $62_4$ of output circuit 97.

In addition to resistor $62_4$, output circuit 97 also comprises output transistor $61_8$ and constant-current circuit $63_3$. Output transistor 61 has its base terminal connected to the higher-potential-side end of resistor $62_4$, its collector terminal connected to logical high power source voltage Vcc', and its emitter terminal connected to ground through constant current circuit 63₃. As explained above, at the higher-potential-side terminal of resistor 62₄ of output circuit 97, there is a sawtooth wave with an amplitude that varies corresponding to the magnitude of power source voltage Vcc. This sawtooth wave is asserted on the base terminal of output transistor 61₈, and, after it is amplified by output transistor 61₈, it is output from the emitter terminal to comparator 12.

Figure 10B:
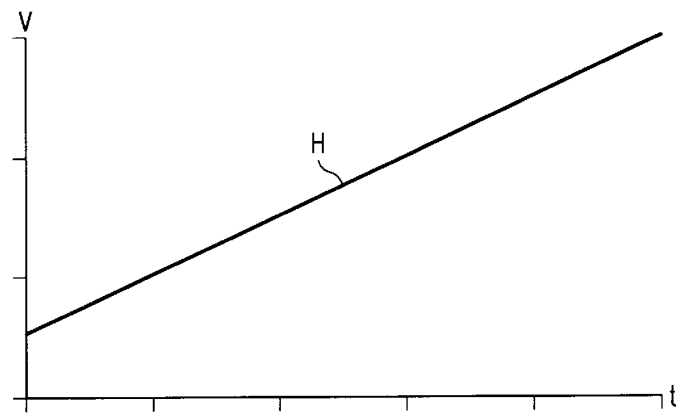

Curves (G) and (H) in FIGS. 10(*a*) and (*b*) illustrate the operation waveforms of amplitude adjusting circuit 50. Curve (H) in FIG. 10(*b*) indicates power source voltage Vcc that rises over time. Curve (G) in FIG. 10(*a*) indicates the output voltage of amplitude adjusting circuit 50 corresponding to the rise in power source voltage Vcc. As shown by curve (G), when power source voltage Vcc rises, there is no variation in the amplitude center voltage or the frequency of the sawtooth wave, and just the amplitude rises.

As explained above, the output voltage of error amplifier 11 is input to the non-inverting input terminal of comparator 12. On the other hand, the sawtooth wave with an amplitude that varies corresponding to power source voltage Vcc is input from amplitude adjusting circuit 50 to the inverting input terminal of comparator 12. Comparator 12 compares the output voltage of error amplifier 11 and the sawtooth wave with an amplitude that varies corresponding to power source voltage Vcc, and it outputs a pulse signal that defines the ON period of switching transistor 2. In this case, during the period when the output voltage of error amplifier 11 is higher than the sawtooth wave, the pulse wave is output, and switching transistor 2 is ON. This pulse signal is output to driver 25, and, by the same operation as that of switching regulator 1 shown in FIG. 1, the ON time of switching transistor 2 is adjusted, and the output voltage becomes constant due to this operation.

If the gain of error amplifier 11 is G(err), the gain of comparator 12 is G(comp), and the gain of the output section is G(LC), the overall gain G(source) of the switching regulator is given by the following:

$$G(source)=G(err)\times G(comp)\times G(LC) \quad (6)$$

Also, if the amplitude voltage of the sawtooth wave input to comparator 12 is Vpp(Vosc), the gain G(comp) of comparator 12 is:

$$G(comp)=Vcc/Vpp(Vosc) \quad (7)$$

Consequently, one can see from said formula (7) that gain G(comp) of comparator 12 is directly proportional to power source voltage Vcc. As a result, in conventional switching regulator 101, when power source voltage Vcc varies, the gain G(comp) of comparator 12 varies correspondingly. Consequently, the overall gain of the switching regulator varies.

However, switching regulator 51 shown in FIG. 8 comprises amplitude adjusting circuit 50. If power source voltage Vcc increases, the amplitude of the sawtooth wave rises; and if power source voltage Vcc decreases, the amplitude of the sawtooth wave falls.

Consequently, when the power source voltage Vcc which is the numerator of said formula (7) rises, the amplitude Vpp(Vosc) of the sawtooth wave which is the denominator of said formula (7) also increases. On the other hand, when the power source voltage Vcc which is the numerator in said formula (7) falls, the amplitude Vpp(Vosc) of the sawtooth wave which is the denominator of said formula (7) also decreases correspondingly. Consequently, even if the power source voltage Vcc varies, the gain G(comp) of comparator 12 is kept almost constant.

Consequently, it is possible to keep the overall gain G(source) of the switching regulator nearly constant independent of variations in the power source voltage Vcc. Consequently, the problems of the prior art, that is, noise in the output voltage, decreased precision, etc., no longer take place.

The switching regulator 51 shown in FIG. 8 comprises switching transistor 2 formed by an nMOSFET. However, the present invention is not limited to this type. As indicated by 85 in FIG. 11, it is also possible to use a switching transistor 38 formed by a pMOSFET. In addition, as indicated by 87 in FIG. 12, it is also possible to use diode 41 as the rectifying element instead of rectifying MOSFET 3.

In addition, as shown in FIG. 17, one can use waveform adjusting circuit 20" or 50', which can adjust both the amplitude of the sawtooth wave and also the amplitude center voltage corresponding to the power source voltage Vcc, in place of amplitude center adjusting circuit 20 and amplitude adjusting circuit 50.

In the constitution of this waveform adjusting circuit 86, the output of power source voltage detecting unit 72 illustrated in FIG. 2 is connected to the higher-potential-side terminal of resistor 62₄ set in output circuit 97 of amplitude adjusting circuit 50 illustrated in FIG. 9. At the higher-potential-side end of resistor 62₄, there is a voltage obtained by superimposing a DC voltage with a magnitude corresponding to the power source voltage Vcc on the sawtooth wave with an amplitude that varies corresponding to the power source voltage Vcc. This voltage is a sawtooth wave with an amplitude and amplitude center voltage that vary corresponding to the magnitude of the power source voltage Vcc. This voltage is amplified by output transistor 61₈, and is then output to comparator 12.

This waveform adjusting circuit 86 performs the functions of both said amplitude center adjusting circuit 20 and amplitude adjusting circuit 50. Consequently, by using said adjusting circuit 86 in the switching regulator, even if power source voltage Vcc varies rapidly, the output voltage is still stable, and the gain is also stable independent of variations in the power source voltage Vcc.

Also, it is clear for those skilled in the art that the diodes in FIGS. 1 and 8 can be individual diodes such as flywheel diodes.

A switching regulator with a stable output voltage independent of variations of the power source voltage can be obtained.

What is claimed is:

1. A drive signal supply circuit which supplies a drive signal to a switching transistor of a switching regulator comprising the switching transistor, a coil, a smoothing capacitor, and a flywheel diode, comprising:

a detecting circuit which detects the output voltage of the switching regulator;

an error amplifier which compares the detection voltage output from said detecting circuit and a reference voltage, and which generates an error signal;

a sawtooth wave signal generating circuit which generates a sawtooth wave signal;

an amplitude center adjusting circuit which accepts said sawtooth wave signal as an input, which changes the amplitude center voltage of said sawtooth wave signal corresponding to the power source voltage, and which outputs an adjusted sawtooth wave signal;

a comparator which compares said error signal and said adjusted sawtooth wave signal, and which generates a pulse signal for controlling the ON period of said switching transistor;

and a driving circuit which generates a drive signal based on said pulse signal output from said comparator and which supplies the drive signal to said switching transistor.

2. The drive signal supply circuit described in claim 1, wherein the amplitude of said adjusted sawtooth wave signal is constant.

3. A drive signal supply circuit which supplies a drive signal to a switching transistor of a switching regulator comprising the switching transistor, a coil, a smoothing capacitor, and a flywheel diode, comprising:

a detecting circuit which detects the output voltage of the switching regulator;

an error amplifier which compares the detection voltage output from said detecting circuit and a reference voltage, and which generates an error signal;

a sawtooth wave signal generating circuit which generates a sawtooth wave signal;

an amplitude adjusting circuit which accepts said sawtooth wave signal as an input, which changes the amplitude of said sawtooth wave signal corresponding to the power source voltage and which outputs an adjusted sawtooth wave signal;

a comparator which compares said error signal and said adjusted sawtooth wave signal, and which generates a pulse signal for controlling the ON period of said switching transistor;

and a driving circuit which generates a drive signal based on said pulse signal output from said comparator and which supplies the drive signal to said switching transistor.

4. The drive signal supply circuit described in claim 3, wherein the amplitude center voltage of said adjusted sawtooth wave signal is constant.

5. A drive signal supply circuit which supplies a drive signal to a switching transistor of a switching regulator comprising the switching transistor, a coil, a smoothing capacitor, and a flywheel diode, comprising:

a detecting circuit which detects the output voltage of the switching regulator;

an error amplifier which compares the detection voltage output from said detecting circuit and a reference voltage, and which generates an error signal;

a sawtooth wave signal generating circuit which generates a sawtooth wave signal;

an adjusting circuit which accepts said sawtooth wave signal as an input, which changes the amplitude center voltage of said sawtooth wave signal and the amplitude of said sawtooth wave signal corresponding to the power source voltage, and which outputs an adjusted sawtooth wave signal;

a comparator which compares said error signal and said adjusted sawtooth wave signal, and which generates a pulse signal for controlling the ON period of said switching transistor;

and a driving circuit which generates a drive signal based on said pulse signal output from said comparator and which supplies the drive signal to said switching transistor.

* * * * *